United States Patent
Rochford et al.

(10) Patent No.: US 10,474,411 B2
(45) Date of Patent: Nov. 12, 2019

(54) SYSTEM AND METHOD FOR ALERTING VR HEADSET USER TO REAL-WORLD OBJECTS

(71) Applicant: Samsung Electronics Co., Ltd., Gyeonggi-do (KR)

(72) Inventors: Ciaran Rochford, Bellevue, WA (US); Philippe Harscoet, Bellevue, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 14/927,309

(22) Filed: Oct. 29, 2015

(65) Prior Publication Data
US 2017/0123747 A1   May 4, 2017

(51) Int. Cl.
| | | |
|---|---|---|
| *G06F 3/14* | (2006.01) | |
| *G06K 9/00* | (2006.01) | |
| *G06T 7/20* | (2017.01) | |
| *G06T 19/00* | (2011.01) | |
| *G06F 3/147* | (2006.01) | |
| *G02B 27/01* | (2006.01) | |

(52) U.S. Cl.
CPC ......... *G06F 3/1423* (2013.01); *G02B 27/017* (2013.01); *G06F 3/147* (2013.01); *G06K 9/00288* (2013.01); *G06K 9/00624* (2013.01); *G06T 7/20* (2013.01); *G06T 19/006* (2013.01); *G06T 2207/30201* (2013.01); *G09G 2354/00* (2013.01)

(58) Field of Classification Search
CPC ........... G06K 9/00771; G06K 9/00288; G06K 9/00624; G06Q 10/0833; H04N 7/186; H04B 5/0062; G02B 27/017; G06F 3/1423; G06F 3/147; G06F 3/011; G06F 3/013; G11B 27/031; G06T 19/006; G06T 19/011
USPC .......................................... 345/633
See application file for complete search history.

(56) References Cited

U.S. PATENT DOCUMENTS

| | | | |
|---|---|---|---|
| 9,113,344 B1* | 8/2015 | Lee .................. | H04W 24/00 |
| 2003/0048926 A1* | 3/2003 | Watanabe ......... | G06K 9/00362 382/103 |
| 2012/0194554 A1* | 8/2012 | Kaino .............. | G08B 13/19613 345/633 |
| 2013/0005467 A1 | 1/2013 | Kim | |

(Continued)

FOREIGN PATENT DOCUMENTS

| | | |
|---|---|---|
| CN | 103383626 A | 11/2013 |
| CN | 103975268 A | 8/2014 |

(Continued)

OTHER PUBLICATIONS

Foreign Communication From a Related Counterpart Application, European Application No. 16192897.3, Extended European Search Report dated Feb. 17, 2017, 9 pages.

(Continued)

*Primary Examiner* — Ryan R Yang

(57) ABSTRACT

A system and method are presented for alerting a head mounted display (HMD) user to real-world objects. The HMD includes a controller, an internal display, and an external sensor. One or more characteristics of an object in a vicinity of the user are detected, using the external sensor. It is determined whether a detected characteristic matches a predefined criterion, and, if so, an alert is displayed to the user on the internal display.

20 Claims, 4 Drawing Sheets

(56) References Cited

U.S. PATENT DOCUMENTS

| | | | |
|---|---|---|---|
| 2013/0093788 A1* | 4/2013 | Liu | G06F 3/011 345/633 |
| 2013/0293470 A1 | 11/2013 | Kwon | |
| 2013/0335301 A1 | 12/2013 | Wong et al. | |
| 2014/0294257 A1* | 10/2014 | Tussy | G06F 17/30247 382/118 |
| 2015/0094142 A1 | 4/2015 | Stafford | |
| 2016/0054565 A1* | 2/2016 | Izumihara | G09G 5/00 345/8 |
| 2016/0246384 A1* | 8/2016 | Mullins | G06F 3/017 |
| 2016/0313790 A1* | 10/2016 | Clement | G06F 3/011 |

FOREIGN PATENT DOCUMENTS

| | | |
|---|---|---|
| EP | 2660643 A2 | 11/2013 |
| WO | 2013052355 A2 | 4/2013 |

OTHER PUBLICATIONS

Foreign Communication From a Related Counterpart Application, European Application No. 16192897.3, Communication pursuant to Article 94(3) EPC, Nov. 13, 2017, 7 pages.

Communication from a foreign patent office in a counterpart foreign application, European Patent Office, "Communication pursuant to Article 94(3) EPC," Application No. EP 16192897.3, dated Jul. 27, 2018, 7 pages.

China National Intellectual Property Administration, "The First Office Action," Application No. CN201610971094.6, dated Apr. 25, 2019, 25 pages.

The State Intellectual Property Office of the People's Republic of China, "The Second Office Action", Application No. CN201610971094. 6, dated Sep. 25, 2019, 23 pages.

* cited by examiner

SYSTEM AND METHOD FOR ALERTING VR HEADSET USER TO REAL-WORLD OBJECTS

TECHNICAL FIELD

The present application relates generally to display devices and, more specifically, to a head mounted display.

BACKGROUND

A head mounted display (HMD) places one or more display screens in front of the eyes of a user, typically to present a pseudo-stereo view of a real or computer generated 3D scene. Except where the HMD is in the form of glasses or goggles through which the user can see "the real world," a HMD typically hinders the user's awareness of objects in his/her vicinity.

SUMMARY

In a first embodiment a method is provided for displaying an alert to a user of a head mounted display (HMD). The HMD includes a controller, an internal display, and an external sensor. The method includes detecting one or more characteristics of an object in a vicinity of the user, using the external sensor, and determining whether a detected characteristic matches a predefined criterion. The method also includes displaying an alert to the user on the internal display if the characteristic matches the criterion.

In a second embodiment a HMD includes a headpiece that removably couples the HMD to the body of a user of the HMD. The HMD also includes an external sensor and an internal display that is visible to the user. The HMD further includes a controller coupled to the external sensor and internal display. The controller detects one or more characteristics of an object in a vicinity of the user, using the external sensor, and determines whether a detected characteristic matches a predefined criterion. If a match is found, the controller displays an alert to the user on the internal display.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The present disclosure adds an external sensor system to a head mounted display (HMD) to provide an alert to a user of the HMD of objects around the user that may physically interact with the user. When the user is immersed in a virtual reality (VR) experience, the HMD of the present disclosure reduces or prevents surprises to the user from real world objects.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method for alerting a HMD user to real-world objects.

Figure 1:
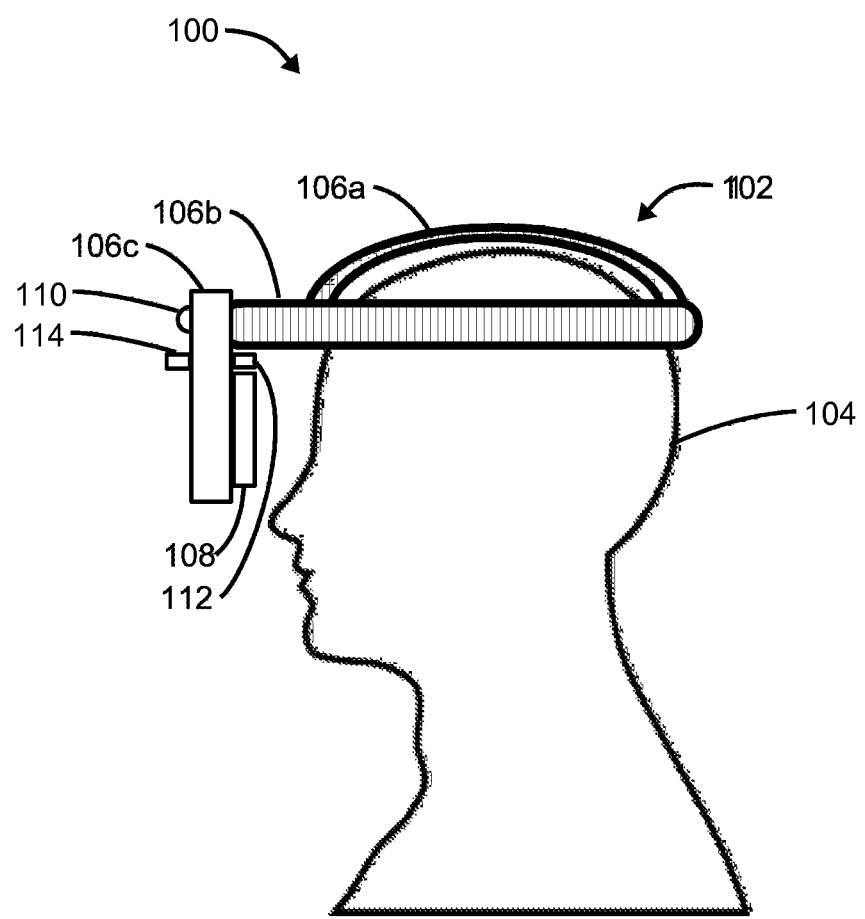
FIG. 1 illustrates a head mounted display according to the disclosure.

FIG. 1 illustrates a head mounted display 100 according to the disclosure. The HMD 100 includes a headpiece 102 that enables a user 104 to wear the HMD 100. The HMD 100 may be removed from the head of the user 104 when not in use. The headpiece 102 includes a band 106b that wraps around the sides and back of the head of the user 104 to maintain display elements of the HMD 100 in front of the face of the user 104. The headpiece 102 also includes a strap 106a that extends from the front to the back of the HMD 100 to support the HMD 100 in a vertical position to maintain at least one display of the HMD 100 in front of the eyes of the user 104.

In other embodiments, the headpiece 102 may be a helmet or other structure suitable for removably coupling the HMD 100 to the head of the user 104 and position display elements of the HMD 100 in front of at least a portion of the face of the user 104.

The headpiece 102 may also include an element 106c for mounting (or mechanically coupling) other elements of the HMD 100 to the headpiece 102. An internal display 108 is mounted to the headpiece 102 in a position the user 104 is able to view the display 108. An internal sensor 112 may be mounted to the headpiece 102 in a position that permits the sensor 112 to acquire information about the user 104.

The internal sensor 112 may include a visual or proximity sensor that acquires information relating to whether the HMD 100 is currently being worn by a user. The internal sensor 112 may include an accelerometer, GPS receiver, or other motion-sensitive device to acquire information relating to movements of the user.

An external sensor 114 is mounted to the headpiece 102 in a position that permits the sensor 114 to acquire information about the user's surroundings. While the sensor 114 is shown mounted to a front side of the HMD 100, it will be understood that in other embodiments the sensor 114 may be mounted in any suitable position on the headpiece 102. In still other embodiments, a sensor system comprising a plurality of external sensors 114 may be mounted in a corresponding plurality of locations around the headpiece 102.

An external indicator 110 may be mounted to the headpiece 102. The external indicator 110 may be an LED or other light-emitting device that provides a visual indication to a person observing the user 104 of the HMD 100. In other embodiments, the external indicator 110 may be an indicator system comprising a plurality of external indicators 110 mounted in a corresponding plurality of locations around the headpiece 102.

The internal sensor 112 and/or the external sensor 114 may comprise one or more of any suitable image-forming sensor technologies. Examples of such suitable technologies include, but are not limited to: infrared (IR) cameras, red-green-blue (RGB) or other visible-light cameras, IR or visible-light depth or stereo cameras.

In some embodiments, the internal display 108 is a smart phone or other standalone device. In such embodiments, one or more of the internal sensor 112, the external sensor 114, and the external indicator 110 may be provided by the smart phone. The internal sensor 112 may be a user-facing camera of the smart phone, the external sensor 114 may be an outward-facing camera of the smart phone, and the external indicator 110 may be a flash or other illuminator of the smart phone.

Figure 2:
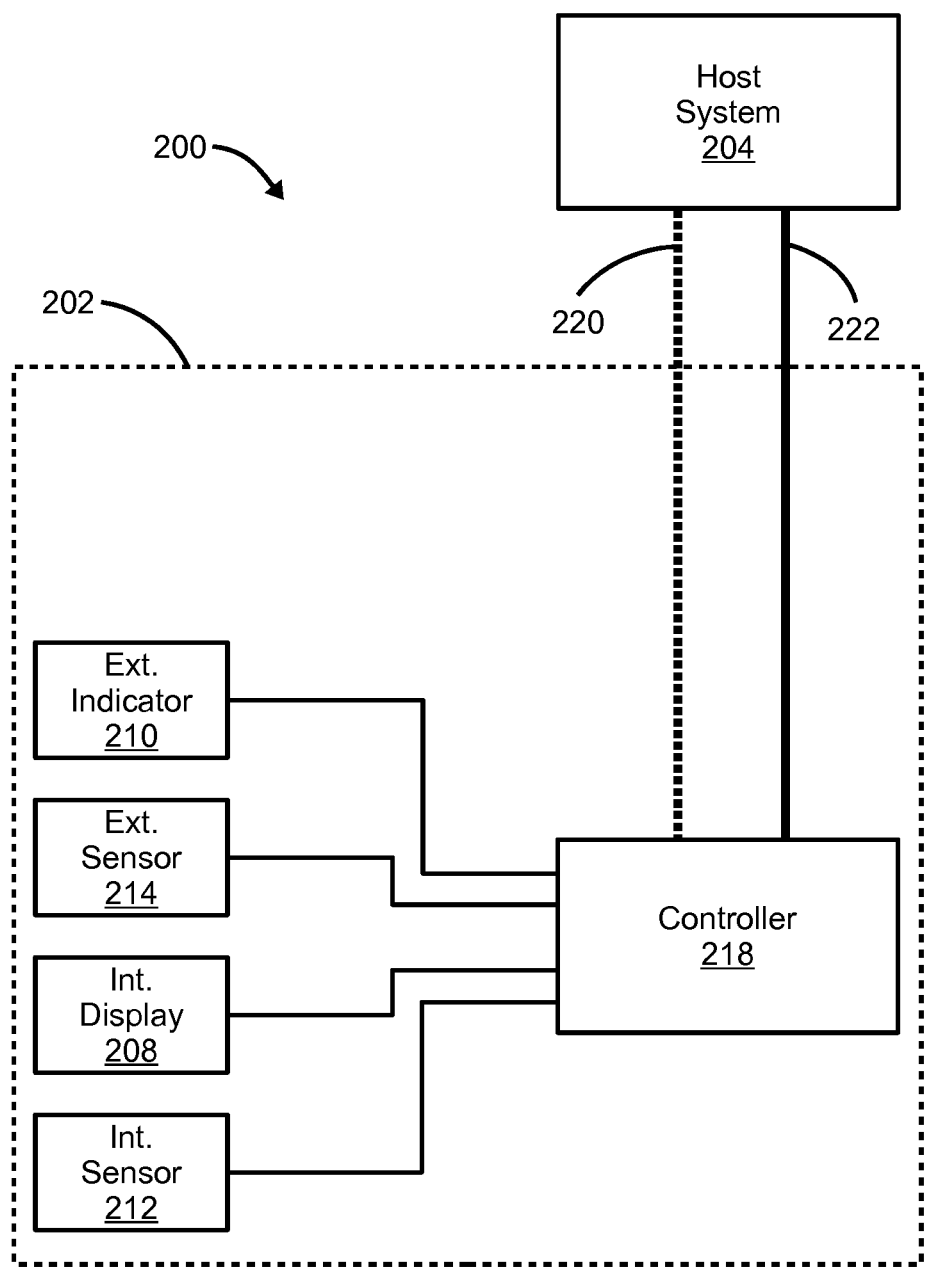
FIG. 2 illustrates a system for use of a head mounted display according to the disclosure.

FIG. 2 illustrates a system 200 for use of a HMD 202 according to the disclosure. The HMD 202 includes a controller 218, which will be described in more detail with reference to FIG. 3. The controller 218 is communicatively coupled to HMD elements internal display 208, optional internal sensor 212, external sensor 214, and external indicator 210. While the HMD elements are shown coupled to the controller 218 by separate links in FIG. 2, it will be understood that in other embodiments, some or all of the HMD elements may be coupled to the controller 218 by a bus system or other suitable communication link. Where the internal display 208 is a smart phone or other standalone wireless device, controller 218 may communicate with such a device via a wired interface, such as an Ethernet or USB, or via a wireless interface, such as IR, Bluetooth, WiFi, or other suitable technology.

In some embodiments, the controller 218 has sufficient processing power to execute a visualization program for generating a VR display for a user of the HMD 202 and provide all functionality of a system according to the disclosure, as described herein. In other embodiments, the controller 218 does not have sufficient processing power to provide all such functionality. In such other embodiments, the controller 218 is communicatively coupled to a host system 204 via one or both of a wireless communication link 220 and/or a wired communication link 222. The host system 204 executes the visualization program and the functionality of the system according to the disclosure. The system functionality may be provided by the visualization program, or may be provided by a driver or other standalone application.

In still other embodiments, the controller 218 may provide some functions of a system according to the disclosure, while the host system 204 provides other functions. For example, the host system 204 may execute the visualization program, while the controller 218 provides other functions of the system. In still other embodiments, some functions of the system may be provided by a third processing platform (not shown) that is communicatively coupled to one or both of the controller 218 and the host system 204. For example, the host system 204 may execute the visualization program, while the third platform provides other functions of the system.

Figure 3:
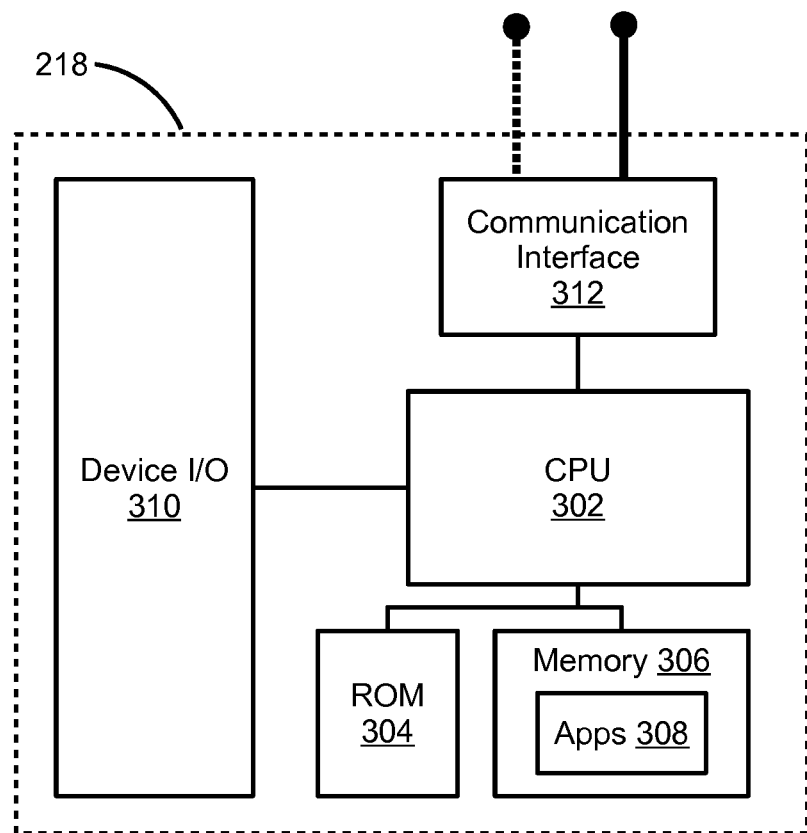
FIG. 3 illustrates a controller for a head mounted display according to the disclosure.

FIG. 3 illustrates a controller 218 for a head mounted display according to the disclosure. The controller 218 includes read-only memory (ROM) 304, random access memory (RAM) 306, central processing unit (CPU) 302, device input/output (I/O) circuitry 310, and communication interface 312. In one embodiment, ROM 304 may store a boot-routine and other static data and RAM 306 may store an operating system (not shown) and applications 308. In an advantageous embodiment, ROM 304 and RAM 306 may comprise a single electronically erasable memory, such as a Flash memory, that is used in conjunction with a conventional RAM memory that is used to store dynamic data. A person of skill in the art will recognize that the controller 218 may include numerous other elements in addition to those shown in FIG. 3.

CPU 302 is responsible for the overall operation of the controller 218. In an exemplary embodiment, CPU 302 executes applications 308. According to the principles of the disclosure, applications 308 provide some or all functionality of a system according to the disclosure, as described herein, and may include a visualization program.

CPU 302 communicates with HMD elements internal display 208, external indicator 210, optional internal sensor 212, and external sensor 214 via device I/O circuitry 310. The CPU 302 communicates with one or both of host system 204 and external device 206 via communication interface 312.

Figure 4:
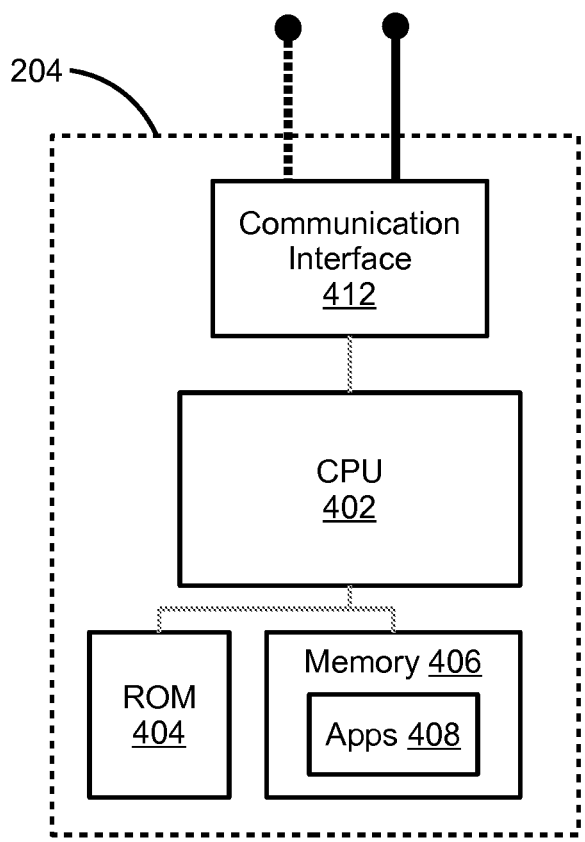
FIG. 4 illustrates a host system for a head mounted display according to the disclosure.

FIG. 4 illustrates a host system 204 for a head mounted display according to the disclosure. The host system 204 includes read-only memory (ROM) 404, random access memory (RAM) 406, central processing unit (CPU) 402, and communication interface 412. In one embodiment, ROM 404 may store a boot-routine and other static data and RAM 406 may store an operating system (not shown) and applications 408. A person of skill in the art will recognize that the host system 204 may include numerous other elements in addition to those shown in FIG. 4.

CPU 402 may responsible for the overall operation of the host system 204. In an exemplary embodiment, CPU 402 executes applications 408. According to the principles of the disclosure, applications 408 provide some or all functionality of a system according to the disclosure, as described herein, and may include a visualization program. CPU 402 communicates with one or both of HMD 202 and external device 206 via communication interface 412.

In some embodiments, the HMD 100 determines a trigger zone that extends out from the location of the user 104. The trigger zone may extend the same distance from the user 104 in all directions (above, below, left, right, front, and back) or the zone may have a different extent in one or more of those directions. The HMD 100 processes information from the external sensor 114 to detect one or more moving objects in the vicinity of the user 104. The HMD 100 calculates velocity (speed and direction) of the moving object and determines whether the moving object will enter the trigger zone around the user 104. If the moving object will enter the trigger zone, the HMD 100 notifies the user of this impending event. That is, the HMD 100 detects a velocity characteristic of the moving objects, determines whether the characteristic matches the predefined criterion of entering the trigger zone, and, if a match is determined, displays an alert to the user.

In other embodiments, the HMD 100 may use the internal sensor 112 to calculate a velocity of the user 104 and determine whether objects in the vicinity of the user 104 (static objects, moving objects, or both) will enter the trigger zone. If the HMD determines that the user's motion will cause an object to enter the trigger zone (for example, the user is about to walk into a table), the HMD displays an alert to the user. In still other embodiments, the HMD may subtract a calculated velocity of the user from a detected velocity of an object to determine that the object will not enter the trigger zone.

In still other embodiments, the HMD 100 may receive information from a host system that is generating the user's VR display. The information may provide an expected path that the user is about to take based upon his/her activity with the VR application being used. This expected path information may then be compared to the positions and/or velocities of objects in the vicinity of the user to predict whether the user will move and cause one or more of the objects to enter the trigger zone. In some such embodiments, the HMD 100 may send information to the host system about the objects in the vicinity of the user, enabling the VR application to alter some element of the user's VR display, thereby changing the user's expected path and reducing the risk of the user colliding with the object(s).

In some embodiments, the HMD 100 may determine that an object detected in the user's vicinity is another person. As described above, the HMD 100 may calculate a velocity for the person, determine whether the person will enter the user's trigger zone, and, if so, display an alert to the user.

In other embodiments, the HMD 100 may detect some other characteristic of the person. The HMD 100 may use facial recognition or other identity recognition processing to determine an identity of the person. If the person's identity matches an identity selected by the user (for example, the user's supervisor, spouse, child, etc.), the HMD 100 displays an alert to the user 104. The HMD 100 may use gesture recognition processing to determine that the person is performing a predefined gesture (for example, waving, raising a stick, pointing a gun, etc.) and, in response, display an alert to the user. The HMD 100 may use gaze-tracking processing to determine that the person is looking at the user 104 and, in response, display an alert to the user 104. In some such embodiments, the HMD 100 may additionally capture one or more of video, audio, and still images of the person making the gesture or looking at the user 104, using the external sensor 114 and/or other sensors of the HMD 100.

In some embodiments, the HMD 100 provides a plurality of operational modes for providing functionality according to the disclosure. In each mode, the user 104 can selectively enable the characteristics of objects that the HMD 100 detects and/or the predefined criteria that the characteristics are matched against. For example, in a "home" mode, the HMD 100 may be set to recognize a spouse, a child, or other family member. In "home" mode, the extent of a trigger zone may be smaller, or displaying an alert in response to a person looking at the user may be disabled. In contrast, in a "public" mode, the extent of the trigger zone may be made larger and gesture recognition may trigger an alert for a larger number of gestures. In an "office" mode, a third combination of characteristics and predefined criteria may be enabled.

In some embodiments, the HMD 100 may be placed into such an operational mode by the user. In other embodiments, the HMD 100 may automatically select an operational mode based on, for example, visually recognizing a home or work environment, or identifying a WiFi access point with which the HMD 100 is in communication as the user's home or office WiFi system or a public access point.

In any embodiment, the alert may be in one or more forms. In some embodiments, the alert is a passthrough window, showing the user a view captured by the external sensor 114 or other visible imagery sensor. In some embodiments, the passthrough window may replace the user's current VR display, pausing the user's activity in the application generating the VR display. The HMD 100 may cause such pausing of activity by sending a message to a host system generating the VR display.

In other embodiments, the passthrough window may be displayed side-by-side with the user's VR display, or as a picture-in-picture inset within the user's VR display. In such embodiments the user may continue with activity in the VR application.

Where the alert is a passthrough window, the HMD 100 may also activate the external indicator 110 when the passthrough window is displayed to the user 104. In this way, a person in the vicinity of the user may be informed that the user is viewing his/her surroundings in the passthrough window.

In still other embodiments, the alert may be a graphic symbol displayed within the user's current VR display. Examples of such a graphic symbol include, but are not limited to, a red circle or the 'walking man' symbol from a street crossing signal.

In yet other embodiments, a position of the alert may communicate to the user a direction of the detected object. A colored border may be displayed on the left side of the user's VR display to indicate an object to the user's left, or a border at the top of the display to indicate an object behind the user.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for use in a head mounted display (HMD), the method comprising:
    detecting, by an external sensor, one or more velocity characteristics of an object in a vicinity of the HMD;
    determining, based on whether the one or more velocity characteristics of the object match a predefined criterion of a plurality of operational modes, by a processor, whether the object is within or will enter a trigger zone of the HMD, the trigger zone comprising an area that extends around an exterior of the HMD, wherein the plurality of operational modes corresponds to a plurality of user environments; and
    in response to a determination that the object is within or will enter the trigger zone, displaying, on an internal display coupled to the HMD, an alert.

2. The method of claim 1, further comprising determining whether the one or more velocity characteristics match a predefined criterion by:
    detecting a velocity of at least one of the object and the HMD; and
    calculating whether the object will enter trigger zone.

3. The method of claim 2, further comprising detecting the velocity of the object and the velocity of the HMD.

4. The method of claim 2, further comprising:
    detecting an environment in which the HMD is operating; and
    selecting a value defining the area of the trigger zone based upon the detected environment.

5. The method of claim 4, wherein detecting the environment comprises one of receiving an input and detecting an identity of a WiFi hotspot with which the HMD is communicating.

6. The method of claim 2, further comprising, in response to determining whether the one or more velocity characteristics matches the predefined criterion, activating an external indicator, visible to a person other than an operator of the HMD.

7. The method of claim 1, further comprising:
detecting that the object is a person; and
detecting an action by the person.

8. The method of claim 7, further comprising, in response to determining that the action matches a predefined criterion, capturing a visual recording of the person.

9. The method of claim 1, further comprising:
detecting that the object is a person;
detecting an identity of the person;
selecting a predefined criterion based upon the identity of the person; and
determining whether the one or more velocity characteristics matches the selected predefined criterion.

10. The method of claim 1, wherein the alert comprises a passthrough window.

11. A head mounted display (HMD), comprising:
a headpiece configured to removably couple the HMD to a body of a user of the HMD;
an internal display coupled to the headpiece and visible to the user;
an external sensor coupled to the headpiece; and
a processor, coupled to the internal display and the external sensor,
wherein the processor is configured to:
detect an object in a vicinity of the HMD,
determine, based on whether one or more velocity characteristics of the object match a predefined criterion of a plurality of operational modes, whether the object is within or will enter a trigger zone of the HMD, the trigger zone comprising an area that extends around an exterior of the HMD, wherein the plurality of operational modes corresponds to a plurality of user environments, and
in response to determining that the object is within or will enter the trigger zone, display an alert on the internal display.

12. The HMD of claim 11, wherein the processor is further configured to:
detect a velocity of at least one of the object and the HMD; and
calculate whether the object will enter the trigger zone.

13. The HMD of claim 12, wherein the processor is further configured to detect the velocity of the object and the velocity of the HMD.

14. The HMD of claim 11, wherein the processor is further configured to:
detect an environment in which the HMD is operating; and
select a value defining the area of the trigger zone based upon the detected environment.

15. The HMD of claim 14, further comprising:
a communications interface, configured to communicate with a WiFi hotspot,
wherein the processor is further configured to detect the environment based upon one of an input received and an identity of a WiFi hotspot with which the HMD is communicating.

16. The HMD of claim 11, wherein the processor is further configured to:
detect that the object is a person;
detect an action by the person; and
determine whether the action matches a predefined criterion.

17. The HMD of claim 16, wherein the processor is further configured to capture a visual recording of the person when the action matches the predefined criterion.

18. The HMD of claim 16, wherein the processor is further configured to:
detect that the object is a person;
detect an identity of the person;
select a predefined criterion based upon the identity of the person; and
determine whether a characteristic of the person matches the selected predefined criterion.

19. The HMD of claim 16, wherein the alert comprises a passthrough window.

20. The HMD of claim 11, further comprising an external indicator, visible to a person other than the user, wherein the processor is further configured to activate the external indicator in response to determining whether a characteristic of the object a matches predefined criterion.

* * * * *